June 24, 1930.   W. E. WATERBURY   1,767,026
PLOTTING DEVICE
Filed July 7, 1923   2 Sheets-Sheet 1

INVENTOR
Webster Earle Waterbury
BY
ATTORNEY

June 24, 1930.  W. E. WATERBURY  1,767,026
PLOTTING DEVICE
Filed July 7, 1923  2 Sheets-Sheet 2

INVENTOR
Webster Earle Waterbury
BY
ATTORNEY

Patented June 24, 1930

1,767,026

UNITED STATES PATENT OFFICE

WEBSTER EARLE WATERBURY, OF SCHODACK, NEW YORK

PLOTTING DEVICE

Application filed July 7, 1923. Serial No. 649,997.

My invention relates to drawing instruments and more particularly to devices for plotting cross sections from data obtained by surveys in the field.

The usual practice in plotting the data obtained in the field is to subtract the rod readings from the height of instrument to obtain the actual elevation of the points on the ground as referred to some datum. These computed elevations are then plotted on paper, commonly called cross section paper, which is ruled to an appropriate scale in two directions at right angles to each other. The labor and time required to make the preliminary subtractions are considerable, errors are frequently made, and it is usual, if not always the practice, to have the subtractions made at least twice by different individuals for the purpose of reducing the possibility of error.

My device contemplates the elimination of this preliminary work of reducing the notes, and its object is to provide a means whereby the rod readings, as recorded in the field, may be conveniently plotted directly without the necessity of first determining the actual elevation of each point plotted and without mental calculation.

I accomplish this result broadly by providing a means whereby the locus of the zero index of a vertical, movable, scale may be adjusted and maintained coincident with the height of instrument as represented on the paper.

In the drawings—

Figure 1:
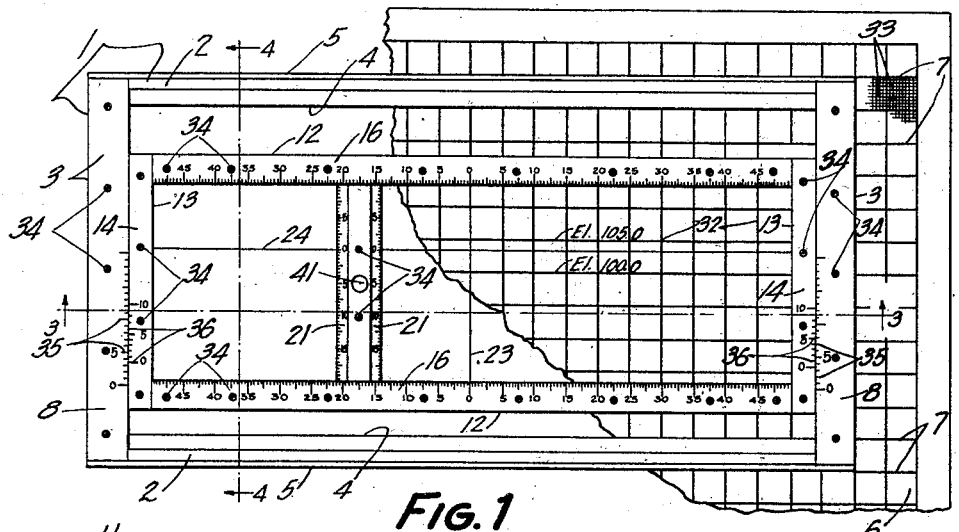
Fig. 1 is a plan view of my complete device in operative position over a fragment of cross section paper.
Figure 2:
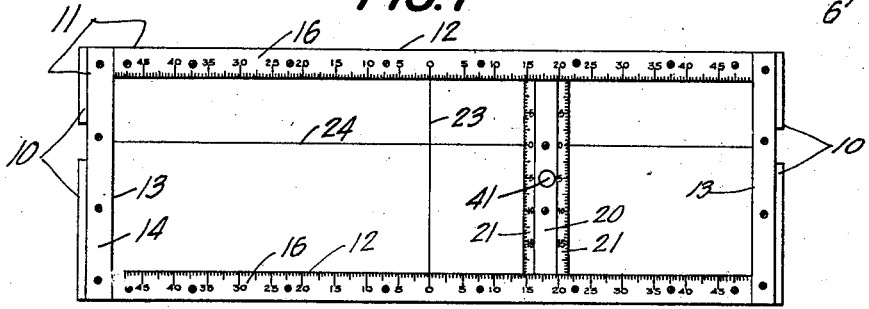
Fig. 2 is a portion of my complete device which may be used alone for plotting.
Figure 3:
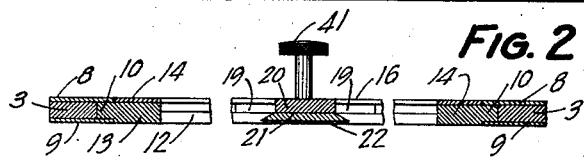
Fig. 3 is an enlarged broken section on the line 3—3 of Fig. 1.

Referring more particularly to Figs. 1, 2, 3 and 4, 1 is the outer frame comprising the horizontal members, 2, maintained in rigidly fixed rectangular relation with the vertical members, 3. The edges of the members, 2, are beveled to provide sharply defined horizontal lines, 4 and 5, substantially in the plane of the cross section paper, 6, to avoid parallax in aligning the frame with the horizontal lines, 7, of the paper. Attached to the top and bottom of the vertical side members, 3, of frame, 1, are relatively thin plates, 8 and 9, respectively, which project over the inner edges of members, 3, as shown in Fig. 3, to form a channel or groove for the reception of the tongue, 10, on the inner frame, 11.

Figure 12:
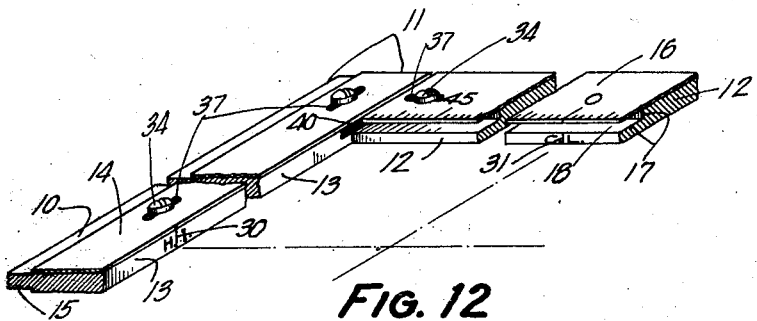
Fig. 12 is a perspective view of a corner of the inner frame.

The inner frame, 11, comprises the horizontal members, 12, and the vertical members, 13, which are maintained in rigidly fixed rectangular relation. Attached to the top of the vertical members, 13, are relatively thin plates, 14, having their outer edges coincident with the inner edges of the plates, 8, on the outer frame. The plates, 14, and the cut out portion, 15, (Fig. 12) on the outer bottom edge of members, 13, form the tongues, 10, slidably fitted between the plates, 8 and 9, so as to permit the inner frame to move vertically in relation to the outer frame but to otherwise retain a fixed relation between the frames. Attached to the upper side of the horizontal members, 12, are relatively thin plates, 16, which project over a cut out portion, 17, (Fig. 12) of these members to form a recess, 18, for the reception of the end members, 19, of the vertical scale carrier, 20, slidably fitted therein. The members, 19, are somewhat longer than the width of the scale carrier and are disposed at right angles thereto so that the scale carrier at all positions is maintained at right angles to the side members, 12. In order to permit the vertical scale to be used over the entire range of the horizontal scales, the recess, 18, is extended into the side members, 13, as shown at 40 in Fig. 12. Suitably secured to the scale carrier is the scale, 21, which is appropriately graduated to conform to the scale of the cross section paper to be used and is arranged to slightly clear the paper as shown at 22, in Fig. 3.

Figure 6:
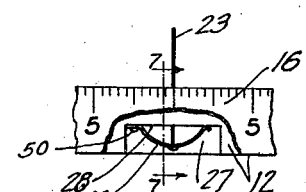
Fig. 6 is a fragmentary plan view of a detail of the inner frame showing the attachment of a cross wire.
Figure 4:
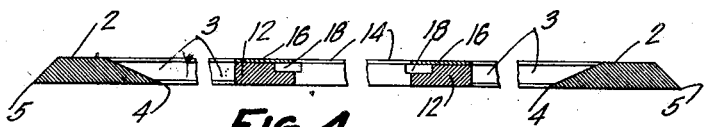
Fig. 4 is an enlarged broken section on the line 4—4 of Fig. 1.
Figures 7, 8:
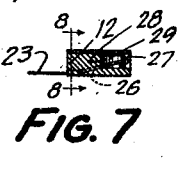
Fig. 7 is a section on the line 7—7 of Fig. 6.
Fig. 8 is a section on the line 8—8 of Fig. 7.
Figure 9:
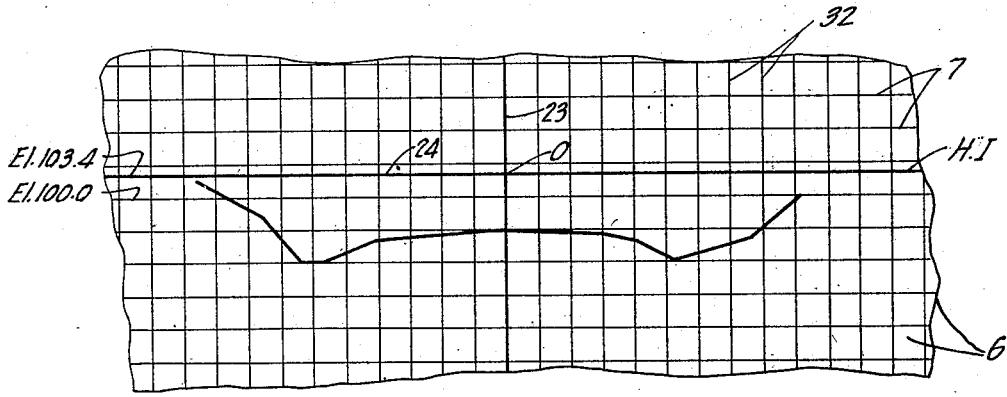
Fig. 9 is a fragmentary view of a sheet of cross section paper with a typical cross section of highway plotted thereon.

For the purpose of having conveniently before the operator a check at all times upon the setting of the instrument, I prefer, in my complete device, to provide the inner frame with the centrally disposed, vertical wire, 23, and the horizontal wire, 24, which I prefer to locate at some distance above the center of the inner frame. These wires should be arranged to lie substantially upon the plane of the paper and may be attached to the members of the frame in any suitable way. In Figs. 6, 7 and 8, I have illustrated how the vertical wire, for example, may be attached to the members, 12, and it is obvious that the horizontal wire may be similarly attached to the members, 13. In attaching the wire, the bottom inner edges of the frame are notched as shown at 25 in Fig. 8, and a hole, 26, is drilled upwardly from the notch to connect with a cut out portion of the frame forming a recess, 27, beneath the plate, 16. Attached to the back wall of the recess is the curved spring, 29, to the center of which, the end of the wire, 23, after being threaded through the hole, 26, is secured in any suitable manner. The spring, 29, is attached at one end only by a screw, 50, so that the other end is free to slide in contact with the back of the recess as the spring is flattened under tension of the wire. The attachment of the wire to springs is, of course, not essential, but it provides a means whereby the wires are always kept taut and it also permits the wires to "give" a little without being broken or stretched beyond their elastic limit. It will be obvious as the operation of the instrument is explained that the wires are not an essential element, and that indications, such as 30 and 31, (Fig. 12) on the inner frame may be used in aligning and adjusting the instrument to operative position. The wires merely form conveniently visible axes of coordinates, and their intersection a visible origin.

In plotting cross sections, particularly in the United States, the paper is usually divided by relatively heavy horizontal lines, 7, and vertical lines, 32, into major divisions of one inch. These major divisions are further subdivided, by relatively light lines parallel to lines, 7 and 32, into minor divisions of one-tenth of an inch. To avoid confusion, the minor divisions are not shown in the drawings except in a fragmentary portion, 33, of Fig. 1. In explaining the operation of my device and the character of the graduations on the scales it will be assumed that paper graduated into inches and tenths of inches, as above, has been selected for use, although it should be clearly understood that my device may be graduated to conform to any paper and I have so designed the instrument that the graduated scales may be easily removed and others substituted.

The plates, 16, which are attached to members, 12, by screws, 34, are provided, adjacent their inner edges, with major graduations of one inch and minor graduations of one-tenth of an inch which are progressively numbered each way from a zero index at the center in alignment with the wire, 23, or indication, 31. The vertical scale, 21, which is horizontally slidable in the inner frame, is similarly graduated on each edge and is progressively numbered each way from a zero index in horizontal alignment with wire, 24, or indication, 30. In my complete device, both the plates, 8, attached to the tops of the side members, 3, of the outer frame, are provided, adjacent their inner edges, with graduations, 35, forming a scale for use with the vernier graduations, 36, provided on the inner frame. This scale and vernier are used for positioning the horizontal wire, 24, or index, 30, at the precise height of instrument as represented on the paper and is appropriately graduated to permit of adjustments to one-tenth of a foot in elevation, or closer if desired. The vernier and scale illustrated in Fig. 1 are graduated to permit adjustments to one-tenth of a foot at a scale of five feet to the inch. In all cases, the zeros of the scale and vernier are so located that when they coincide with each other, and at least one of the aligning edges, 4 or 5, on the outer frame, is coincident with a major division of the paper, the cross wire, 24, or the indications, 30, will coincide with a major horizontal division of the paper. While it is essential that only one of the edges, 4 or 5, be used in aligning the device, I prefer to so proportion the distances between all of the edges that any or all of them may be used for aligning. In other words, I prefer to make the distance between the inner edges, 4, of the outer frame and the width of the members, 2, between the edges, 4 and 5, such that when any one of the edges is placed coincident with a major horizontal division of the paper, each of the other of said edges will coincide with a like division.

Figure 10:
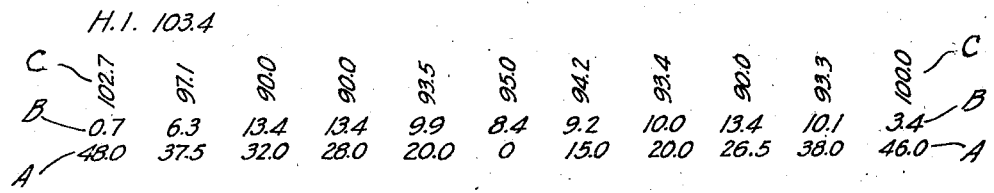
Fig. 10 is a typical set of notes for the cross section plotted in Fig. 9.

In explaining the operation of my device, reference will be had particularly to Figs. 1, 9, 10 and 12. Fig. 10 is a typical set of notes for the section plotted in Fig. 9. The figures in the horizontal line, A, represent distances in feet to the right or left of the center of the section, or to the right or left of a line arbitrarily located upon the ground and sometimes called a base line, from which the work is located in the field. The figures in horizontal line, B, set over the figures in line, A, are the rod readings taken at the points as located in line, A. H. I 103.4, indicates the height of the leveling instrument at which the rod readings were taken, and the figures in line, C, represent the actual elevations of the points located in line, A, as ascertained by deducting the respective rod readings from the H. I. In other words, line, A, gives the abscissas of the points, and line, B, gives the ordinates of the points as referred to an origin of coordinates, O, at the intersection, on the paper, of a horizontal line representing the height of instrument, and a vertical line representing the center line of the section.

Assuming that it is desired to plot the notes of Fig. 10, the instrument is laid upon the paper so that the vertical wire, 23, or index, 31, registers with one of the major vertical divisions of the paper, and one of the horizontal aligning edges coincides with one of the major horizontal divisions. Retaining the outer frame in this position, the inner frame is moved vertically until the proper height of instrument is read on the vernier which automatically brings the horizontal cross wire, 24, or the indices, 30, and the zero index of scale, 21, to the height of instrument on the paper. This position is illustrated in Fig. 1. It will be noted that the vernier reads 3.4 and obviously may be read to tenths between the limits 0.0 and 10.0 only. The range of the vernier need not be greater than this for it is usual to assume a convenient one of the major horizontal divisions to be at an elevation which is the nearest multiple of ten feet or five feet to the height of instrument. The device is now in position to begin actual plotting. The points are rapidly located on the paper by grasping the knob, 41, and sliding the vertical scale, 21, to the right or left of the center line, as the case may be, until an edge coincides with the proper abscissa reading on the horizontal scales, 16. In this position, all rod readings or ordinates measured in the field at that abscissa distance may be located by scaling the ordinate or rod reading directly from the scale, 21, along the edge coinciding with the abscissa reading. It will be obvious that but one horizontal scale, 16, and but one graduated edge of scale, 21, are necessary, but I have provided two merely for convenience. Likewise, but one vernier is necessary although I prefer to provide one at either side, as shown in Fig. 1, to insure absolute parallelism of the frames when plotting.

Where a device less expensive than my complete instrument is desired, very good results may be obtained by dispensing entirely with the outer frame and using the device illustrated in Fig. 2. When used in this form, the device may be centered upon the paper and the cross wire, 24, or indices, 30, may be adjusted to the proper height of instrument by eye, and the points located as before by means of the horizontal scale and the sliding scale.

Figure 5:
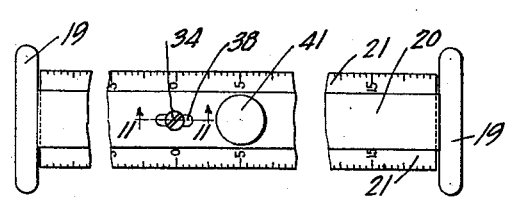
Fig. 5 is an enlarged broken plan view of the horizontally sliding scale and its carrier.

In order that my device may be readily adapted for use in plotting to different scales, or for use in connection with differently graduated cross section papers, it is obvious that the scale, 21, and the graduated plates, 8, 14 and 16, may be removed by taking out the screws, 34, so that appropriately graduated scales and plates may be substituted. To provide for slight inaccuracies in the position of screw holes, etc., in the plates and scales, I prefer to make all the holes, 37, slotted so that the scales may be adjusted in a longitudinal direction to make the zeros of the verniers coincide with the zeros of the scales, and the zeros of the horizontal scales coincide with the cross wire, 23, or indices, 31. For the purpose of permitting the zero index of scale, 21, to be adjusted to horizontal alignment with cross wire, 24, or indices, 30, I slot the scale carrier as shown at 38 in Fig. 5.

Figure 11:
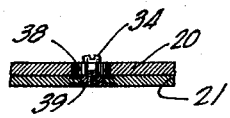
Fig. 11 is a section on the line 11—11 of Fig. 5.

Both my frames may be made integral by casting or otherwise, and in any event I prefer to construct them of a non-corrosive material which will be perfectly rigid and not susceptible to changes in form, etc., due to climatic or atmospheric conditions. The scales may be of metal, but scales of any opaque, white, substance having the characteristics of celluloid or bakelite are not subject to atmospheric changes, are much easier read, and are to be preferred for these reasons. The entire scale, 21, may be of celluloid or the like, or it may be of the ordinary boxwood type having graduated edges of white celluloid. Where any substance other than metal is used, metal bushings, 39, (see Fig. 11) should be provided for the screw threads.

Where a very cheap instrument is desired with which the rod readings may be plotted direct, my device as shown in Fig. 2 may be provided without the horizontal scale. This requires the operator to use the graduated paper as a horizontal scale for measuring the abscissas of the points, which of course, requires some mental effort in counting the lines.

In describing my invention I have used the words "horizontal," "vertical," "horizontally" and "vertically" in their ordinarily understood sense in the art of surveying to which this invention relates; and where these words are used to define the relative positions and movements of elements of my device, it is to be understood that they define directions at right angles to each other and which conform to the usual representations on paper of the corresponding directions in the field.

While I have described my invention in its complete and modified forms as I prefer to construct it, I do not wish to limit myself in any way to details of construction illustrated or described, and it is therefore understood that changes, within the scope and spirit of the appended claims, may be made without departing from the essence of my invention.

I claim—

1. A device for plotting cross sections directly from rod readings, comprising an open frame having two rectangularly disposed cross wires intersecting near the center of said frame and forming an origin and axes of coordinates and a guiding means for placing said device in proper operative alignment with the lines of a cross section paper, there being a fixed scale on said frame parallel to one of said wires and having appropriate graduations thereon numbered each way from a zero index at said origin, and a second scale slidably mounted on said frame for movement along said scale in a direction perpendicular to the other of said wires and having appropriate graduations thereon numbered from a zero index at said origin.

2. In a device for plotting cross sections directly from rod readings, the combination with an open rectangular frame having a fixed scale along one edge thereof with appropriate graduations consecutively numbered each way from a zero at the center, of a wire extending between opposite sides of said frame parallel to said scale, and a second scale perpendicular to said first scale movably mounted within the frame to slide in a direction parallel to said wire, and having appropriate graduations consecutively numbered from a zero at the wire.

3. A device for plotting cross sections directly from rod readings comprising an open frame provided with an aligning edge adapted to form a guide for placing said device in operative alignment with a cross section paper, a second frame movably mounted in said first frame to slide in a direction perpendicular to said aligning edge, a plotting scale carried by the second frame and perpendicularly disposed to said aligning edge but adapted to slide in a direction parallel thereto, and a scale on one of said frames coacting with a vernier on the other for precisely measuring the relative movement of said frames.

4. In a device for plotting cross sections directly from rod readings, the combination with an open rectangular frame of a second rectangular frame slidably mounted in the first frame, two rectangularly disposed scales carried by the second frame and moving therewith but one of said scales being movable in a direction parallel to the other within said inner frame.

5. A device for plotting cross sections directly from level notes giving the height of instrument and the rod readings only, comprising the combination with an open, rectangular frame of a plotting scale movably mounted in oppositely disposed sides thereof to slide in a direction parallel to said sides, there being appropriate graduations on said scale numbered from a zero index near the center, and a wire stretched between opposite sides of said frame perpendicular to the plotting scale and indicating the locus of the movement of its zero index across the frame, whereby said frame may be accurately placed in operative alignment with a cross section paper and the locus of the movement of the zero index precisely adjusted to the height of instrument as represented on the paper.

6. In a device of the character described, the combination with an open frame provided with an aligning edge, of a scale having a zero index thereon and slidably mounted within said frame to move both parallel and normal to said aligning edge and means for indicating the precise movement of the zero index relative to said aligning edge.

WEBSTER EARLE WATERBURY.